United States Patent [19]

Mackrle et al.

[11] Patent Number: 4,664,794
[45] Date of Patent: May 12, 1987

[54] APPARATUS FOR BIOLOGICAL ACTIVATING CLEANING OF WASTE WATERS CONTAINING NITROGENOUS MATERIALS

[75] Inventors: Vladimir Mackrle, Prague; Svatopluk Mackrle, Pavikova Brno, both of Czechoslovakia

[73] Assignee: Slovenska vysoka skola technicka, Bratislava, Czechoslovakia

[21] Appl. No.: 627,875

[22] Filed: Jul. 5, 1984

[30] Foreign Application Priority Data

Jul. 4, 1983 [CS] Czechoslovakia ............... 5053-83

[51] Int. Cl.$^4$ ............................................. C02F 3/20
[52] U.S. Cl. ................................... 210/188; 210/197; 210/207; 210/218
[58] Field of Search ............... 210/197, 207, 218, 256, 210/903, 188

[56] References Cited

U.S. PATENT DOCUMENTS

| | | | |
|---|---|---|---|
| 3,239,067 | 3/1966 | Hikes et al. | 210/197 X |
| 3,429,442 | 2/1969 | Mackrle et al. | 210/207 X |
| 3,535,236 | 10/1970 | Travis | 210/218 X |
| 4,167,479 | 9/1979 | Besik | 210/903 X |
| 4,251,371 | 2/1981 | Bauer et al. | 210/219 X |
| 4,346,000 | 8/1982 | von Drooge | 210/218 X |
| 4,412,003 | 10/1983 | Evans | 210/218 X |
| 4,425,231 | 1/1984 | Fujimoto et al. | 210/903 X |

Primary Examiner—Tom Wyse

[57] ABSTRACT

Method of biological activating cleaning of waste waters containing nitrogenous materials at conditions of a lowly loaded sludge with simultaneous nitrification of organic nitrogen and ammonia to nitrates while using fluid filtration and an arrangement for execution of this method where the waste water, after its activating cleaning with supply of oxygen, is subsequently cleaned in the course of fluid filtration by denitrification without presence of oxygen creating flotating sludge which is circulated at least partly to the aerobic activating cleaning.

9 Claims, 4 Drawing Figures

APPARATUS FOR BIOLOGICAL ACTIVATING CLEANING OF WASTE WATERS CONTAINING NITROGENOUS MATERIALS

BACKGROUND OF THE INVENTION

The invention relates to a method and apparatus for biological activating cleaning of waste waters containing nitrogenous materials using lowly loaded sludge with simultaneous nitrification of organic nitrogen and ammonia to nitrates while using fluid filtration.

In the technology of water cleaning, a target achievement is higher efficiency of cleaning such that the cleaned water may be used in closed technological cycles producing no waste water. In order to achieve this goal, it is necessary to clean waste waters not only of commonly appearing organic contaminating materials but also of nitrogenous contamination.

It is known that the majority of waste waters contain varying amounts of nitrogenous materials which are present in the water mostly in the form of organic nitrogen or ammonia. It is also known that by aerobic activating cleaning at lowly loaded activation it is possible to convert organically bound nitrogen and ammonia by microbial nitrification oxidation processes to nitrates.

It is further known that the presence of nitrates in the activating mixture due to nitrification processes causes a substantial deterioration of the functioning of cleaning arrangements due to flotation of sludge in the course of separation.

With known arrangements using fluid filtration for separation of the suspension of the activated sludge from the cleaned water, this effect is particularly conspicuous. The causes of flotation of sludge are denitrification processes in the fluid filter where gaseous nitrogen is released which sticks to particles of activated sludge in the shape of bubbles so that their specific weight is reduced to such an extent that particles of activated sludge with sticking bubbles which are lighter than water float to the surface of the liquid. This kind of flotation of sludge occurs in conditions where no solved oxygen is present in the fluid filtration layer and where high temperature of the activating mixture increases the intensity of the denitrification processes.

As the majority of waste waters contain nitrogenous materials in an amount which is sufficient for denitrification processes in the fluid filter, the flotation effect shows in a greater or lesser degree with most waters which are cleaned biologically at lowly loaded activation with simultaneous denitrification. In order to achieve a rather apparent flotation, a content of 10 mg. per liter $N-NO_3$ in the activation mixture is sufficient. This concentration is present in practically all waste waters including sewage which are cleaned in conditions of lowly loaded activation. In order to achieve an effective separation by fluid filtration it has been therefore endeavored to reduce these denitrification processes in the fluid filter in order to reduce these disturbing influences of flotation. It is possible to achieve this by two methods: first, by increasing the content of dissolved oxygen in the activating mixture, which is secured by supplying oxygen also into the fluid filtration layer in an increased amount. A second possibility is a reduction of retention of the activating mixture in the fluid filter by reduction of its volume.

As the space of the fluid filter requires, for its correct functioning, a shape with a flow area increasing in the upward direction, which is in practice the shape of a cone or prism, the content of the fluid filter is highly dependent on its height. In order to prevent creation of conditions of presence of dissolved oxygen, it is therefore necessary to maintain the surface of the fluid filter at a small height, which secures its small volume, where the stored oxygen is sufficient for maintenance of conditions with presence of dissolved oxygen.

Preventing flotation due to denitrification has, however, substantial drawbacks. The suppression of denitrification by increased supply of oxygen to the fluid filter by its increased concentration in the activating mixture substantially increases claims on power for aeration. The reduction of the time the activating mixture is retained in the fluid filter by reduction of its volume reduces the hydraulic capacity of separation. As by reduction of its volume, also its separation surface is reduced, which reduces the capacity of the whole arrangement.

In addition to these drawbacks, the maintenance of the supply of oxygen to the fluid filter brings further drawbacks, particularly in complex systems of activating cleaning of waste waters with simultaneous nitrification and denitrification. Where the technology of denitrification using a uniform sludge is applied, the increased oxygen content in the activating mixture requires an increased volume of the denitrification space due to supply of a certain unwelcomed increased amount of oxygen into the denitrification space where there is circulation of the mixture between the aerated and non-aerated zone of activation.

SUMMARY OF THE INVENTION

It is an object of this invention to eliminate the above mentioned drawbacks and to provide a method and an apparatus for biological activating cleaning of waste waters containing nitrogenous materials using fluid filtration where nitrates would be effectively removed with a simultaneous removal of organic contaminations. According to this invention the waste water, after it has been submitted to activating cleaning with oxygen supply or after alternate activating cleaning with and without supply of oxygen, is additionally cleaned in the course of fluid filtration by denitrification without presence of oxygen, creating thereby flotated sludge which is at least partly recirculated to the aerobic activating cleaning.

With the apparatus for execution of this method, in the space for fluid filtration, the flow area of which increases in the upward direction, the surface of the fluid filter is substantially at the level of the maximum width of the space for fluid filtration and is covered by a cover with discharge openings. The discharge openings are provided with screening walls in front of the openings in order to prevent passage of flotated sludge by way of these discharge openings, which connect the space for fluid filtration with the take-off system of cleaned water. Below the central top part of the cover, which is provided with a gas outlet, one or more take-off means are provided for removal of flotated sludge below the level of cleaned water and below the surface of the fluid filter. At least one inlet for take-off means is provided for removal of the upper layer of the fluid filter.

From the point of construction and operation, it is an advantage of the present invention that the means for removal of flotated sludge is provided with at least one air lift pump, the inlet of which has a funnel shape open in the upward direction and the outlet of which can be connected with the activating space. The outlet may also be connected with the discharge of excess activated sludge and at least one air lift pump can form the take-off means for removal of the upper layer of the fluid filter, the inlet of which air lift pump has a funnel shape open upwards and its outlet can be connected with the activating space.

Another feature of the invention is that the outlet of means for taking-off the flotated sludge terminates into a de-aeration receptacle connected to a conduit forming closeable a connection with the activating space, whereby the closeable means for taking-off excess activated sludge can be also connected to said conduit and furthermore said conduit can also be connected to a discharge of excess activated sludge.

Where a standing circular embodiment of the apparatus with vertical axis is used, it is preferable that the cover have a substantially conical or vaulted shape. Where a lying execution with a longitudinal separating space is used, it is preferable that the cover have the shape of a longitudinal dome, a cylindrical shape, or be made of corrugated material, e.g. sheet, laminate and the like.

BRIEF DESCRIPTION OF THE DRAWINGS

With these and other objects in view, which will become apparent in the following detailed description, the present invention, which is shown by example only, will be clearly understood in connection with the accompanying drawing, in which.

DETAILED DESCRIPTION OF THE DRAWINGS

Figure 1:
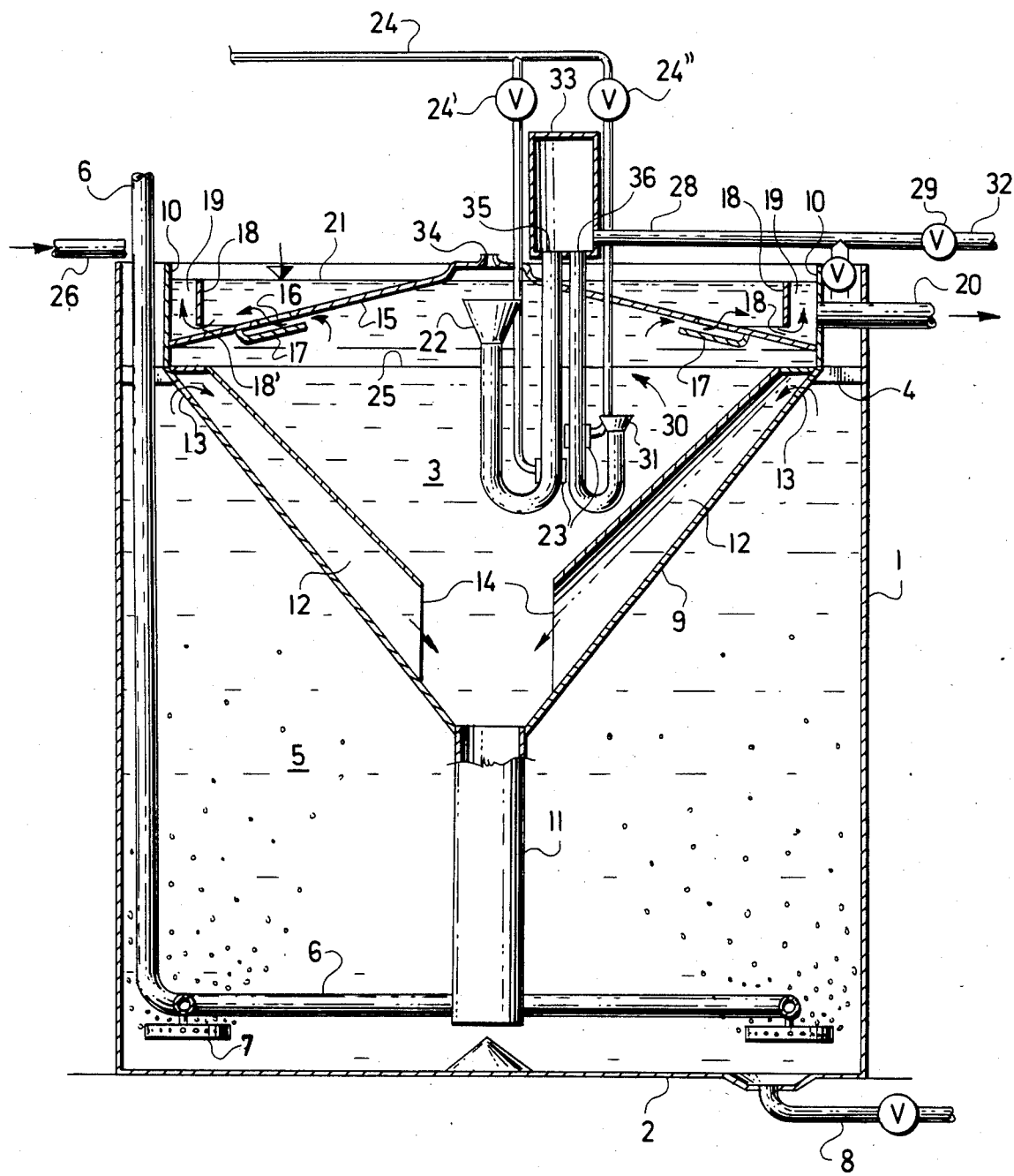
FIG. 1 is a vertical axial cross sectional view of an arrangement for biological activating cleaning of waste waters in a vertical circular container.

The arrangement shown in FIG. 1 comprises a cylindrical container having a mantle 1 and a bottom 2. A separator 3 of the activated sludge with a space for fluid filtration is inserted into the upper part of the mantle 1. The separator 3 is connected to the mantle 1 by consols 4 or it can be supported by not shown supports situated on the bottom 2. The remaining space of the container beyond the separator 3 is designed for the activating space 5.

The activating space 5 is for an aerobic activating process of water cleaning provided with some known aeration system, for instance with a pneumatic system comprising a not shown blower, distribution conduits 6 and aeration elements 7.

A closeable discharge means 8 for draining the container is provided in the bottom 2.

The separator 3 is defined by a partition wall 9 widening in the upward direction, preferably of conical shape, securing that the flow area of the separator 3 determined by the partition wall 9 is increasing upwards. The partition wall 9 passes over, in its upper part, into an extension 10 of cylindrical shape and is, in its lower part, connected to a channel 11 terminating into the lower part of the activating space 5.

By-pass channels 12, preferably of circular cross section contracting the partition wall 9, are provided inside the separator 3. Inlet openings 13 are arranged both in the partition wall 9 and in the by-pass channels 12 in their upper part. Outlets 14 of by-pass channels 12 terminate in the lower part of the separator 3. The cross sections of by-pass channels 12 are widening downwards.

The upper part of the separator 3 is provided with collecting openings 16. Screening walls 17 in front of openings 16 prevent the passage of flotated sludge over collecting openings 16 into a collecting system of cleaned water, arranged at a larger height. A cylindrical immersed wall 18 with openings 18' is fastened to the extension 10 which, together with the extension 10, forms a cleaned water collecting channel 19, provided with a discharge 20.

At the top of the conically narrowing space below the cover 15, i.e. in its central part, provided with a gas outlet 34, an inlet 22 of a take-off arrangement 23 for taking-off flotated sludge is provided. Preferably, an air lift pump 23 with an air inlet 24 provided with a closure 24' is connected to a not shown time switch. A second pumping means, represented by a second air lift pump 30 with a funnel shaped inlet 31, situated below the surface 25 of the fluid filter is also arranged in the separator 3. A closure 24" is inserted into the air supply for this second air lift pump 30, and connected to another not shown time switch. The outlets 35 and 36 of both air lift pumps 23 and 30 terminate into a de-aeration receptacle 33 with an outlet 28 terminating to the activating space 5 or into a discharge 32 beyond the apparatus.

The surface 25 of the fluid filter should coincide with the maximum cross section of the separator 3. This means, however, that the surface 25 of the fluid filter can also be above the place where the partition wall 9 meets the extension 10 at any level where the maximum flow area of the separator 3 is practically not changing. Such conditions are advantageous for achieving a maximum retention time of the liquid in the fluid filter. The raw water is supplied to the activating space 5 over the inlet 26 terminating between the mantle 1 and the extension 10.

The arrangement shown in FIG. 1 is not limited to a cylindrical shape of the mantle 1 nor to the use of a single separator 3 in the container. The shape of the container may be rectangular for example. The number of separators 3 may be different for different sizes of the container, however at least one separator 3 must be used. The shape of the separator 3 is also not limited to a rotational shape. For rectangular containers, a rectangular separator can be of advantage. The hydraulic arrangement of the passage of the activating mixture from the activating space 5 to the separator 3 can differ from the exemplary embodiment of FIG. 1. For instance, an arrangement is possible with a by-pass channel provided below the partition wall 9 with a centrally situated by-pass channel and the like.

The arrangement 23 for removal of the flotated sludge can comprise a number of pumps, preferably air lift pumps with individual inlets 22 and outlets 35 and the pumping device 30 for removal of the upper layer of the fluid can be provided by a number of air lift pumps with individual inlets 31 and outlets 36. Similar arrangements are advantageous for an apparatus with a horizontal arrangement of activating and separating spaces mostly with rectangular plan view.

The arrangement according to this invention operates as follows:

Raw water is supplied via the inlet 26 into the activating space 5. The arrangement shown in FIG. 1 is designed for aerobic activating cleaning of waste water and therefore a pneumatic aeration system is arranged in the activating space 5 by means of which air is supplied to the activating mixture by aeration elements 7. Distribution conduits 6 serve for distribution of air to aeration elements 7 which conduits 6 are connected to a not shown blower. The arrangement is not limited to a pneumatic aeration system, and a known hydraulic aeration system would be suitable.

The water is cleansed by means of aerobic activating processes by biodegradation of organic matter whereby a suspension of a biomass is generated which has to be separated from the cleaned water. The separator 3 serves this purpose, where the floccular suspension of activated sludge is separated from the cleaned water and the separated suspension is returned to the activating process.

The process of separation of activated sludge and its return proceeds as follows:

The activating mixture enters the separator 3 over inlet openings 13 and over by-pass channels 12 and enters the lower narrower part of the separator 3 over outlets 14. Due to removal of cleaned water over the collecting channels 19 the direction of flow of the activating mixture from the outlets 14 is turning upwards and in the ascending flow a fluid filter is created from the floccular suspension of the activated sludge. Due to adhesive forces, particles of activated sludge are caught in the fluid filter and, due to coagulation forces, larger particles are originating which cannot be maintained in the ascending flow in a floating space and are returning as concentrated sludge, due to gravitation to the lower part of separator 3 and are falling back over the channel 11 to the activating space 5.

Where the hydraulic load does not surpass a certain value depending on the character of the suspension, a surface 25 of the fluid filter is created, above which a zone of clean water without the suspension is present.

As the cover 15 covers the whole flow area of the separator 3 it is possible that the surface 25 of the fluid filter can rise up to the level of its large cross section, thus increasing the effective separation surface which corresponds to the maximum plan view of the separator 3.

The collecting openings 16 in the cover 15 serve for a uniform removal of cleaned water-free of flotated sludge—which water passes thereafter over openings 18' of the immersed wall 18 to the collecting channel 19 and over the discharge 20 beyond the apparatus.

In order to prevent any penetration of flotated sludge to collecting openings 16, screening walls 17 are provided in front thereof which allow passage of cleaned water but prevent penetration of flotated sludge.

The fluid filtration proceeds by the major part at conditions without access of oxygen. This is achieved by increase of its volume and by reduction of the concentration of oxygen in the activating mixture entering the separator 3, i.e. into the fluid filter, to a value required for the process of biodegradation and nitrification processes of the activating water cleaning.

Thus created conditions in the layer of the fluid filter enable subsequently a course of denitrification where nitrates are reduced to gaseous nitrogen. Donors of hydrogen for enzymatic denitrification processes are serving residual organic contaminations of the cleansed water or the organic matter of the biomass.

The denitrification method proceeding directly in the fluid filter offers a number of effects. The main effect is in an increase of the efficiency of cleaning, particularly in the removal of nitrates with a simultaneous reduction of organic contaminations. Another effect is a substantial increase of the capacity for separation due to increase of the effective separating surface with an increase of the volume of the fluid filter. A further effect is the possibility of reduction of oxygen concentration in the activating space in the activating mixture for achievement of anaerobic conditions in the fluid filter, thus reducing claims on power for aeration.

The creation of a zone without supply of oxygen in the fluid filter with proceeding denitrification processes does result, however, in the generation of gaseous nitrogen which, in the shape of tiny gas particles, remains sticking on the surface or directly in the structure of particles of activated sludge. The gas particles reduce the specific weight of the activated sludge, and as a result, two phenomena occur. Light particles of activated sludge with sticking gas particles collect in the upper layer of the fluid filter, where they remain stagnant and increase substantially its volume. This layer gradually grows in the course of operation, raising the surface of the fluid filter which causes a gradual reduction of the output of the arrangement, or of the quality of the cleaned water, by penetration of a large amount of activated sludge into the discharge of cleaned water.

When there is a larger amount of sticking gaseous nitrogen, the particles of activated sludge become lighter than water and flotation of these particles results. By denitrification in the fluid filter, it is possible to achieve removal of nitrates in an amount of 10 to 30 mg. per liter. This generates such an amount of gaseous nitrogen that the flotation of activated sludge overtops the production of biomass in the activating process, and it is thus necessary to return the floated sludge into the activating process.

An air lift pump 30 with a funnel shaped inlet 31 situated below the surface 25 of the fluid filter serves for taking off the stagnant upper layer of the activated sludge and for its recirculation back into the activating process. The repumped activated sludge of the stagnant layer is returned to the activation over the dearation receptacle 33 by way of an outlet 28 terminating into the upper part of the activating space 5. The removal of the stagnant layer is performed periodically within one or more days, according to the intensity of this phenomenon which is different for different kinds of water and for different conditions. The determination of this time interval is best made according to actual conditions.

The cover 15, enabling a concentration of the flotated sludge in the highest part below the cover 15, serves for catching the flotated sludge and for its returning to the activation, wherefrom it is pumped by the air lift pump 23 with a funnel shaped inlet 22 below the level 21 by way of the dearation receptacle 33 over the outlet 28 into the activating space 5.

The removal of flotated sludge is accomplished within shorter intervals, on the order of hours, in order that the sludge remain perfectly fluent and not form a compacted layer which would cause difficulties in the course of pumping. An automatic pumping of the flotated sludge and of the stagnant layer is secured by connection of the closures 24' and 24", provided in the air supply conduits of air lift pumps 23 and 30, to not shown time switches. Excess activated sludge is also removed in the shape of flotated sludge by the air lift pump 23, namely over the discharge 32 provided with a slide valve 29.

The intensity of denitrification depends, among other parameters, on the time of retention of the cleaned water in the fluid filter at conditions without supply of oxygen. The retention time and the mentioned conditions increase with the height of the surface of the fluid filter due to increase of the volume with the cube of its height. The covering of the whole flow area of the separator 3 by the cover 15 with the possibility of recirculation of the flotated suspension back into the activating process substantially increases the possible hydraulic load of separation.

By the described method and arrangement, an increase of the effectiveness of cleaning by removal of nitrates with simultaneous removal of residual organic contaminations can be achieved. It is therefore particularly suitable for less contaminated waters with a content of nitrogenous materials on the order of several tens of mg. per liter of the overall nitrogen content.

The arrangement according to this invention is not limited to the described examplary embodiment and can be advantageously utilized for activating cleaning of waste waters with simultaneous denitrification.

Industrial waste waters, for instance waste waters from the food stuff industry such as slaughterhouse waste waters and the like or waste waters of the chemical industry, for instance from coking plants, from the petrochemical industry and also zootechnical waste waters contain a larger concentrations of nitrogenous contaminations. Due to requirements of a repeated utilization of the water for technological purposes it is necessary to clean these waters not only for carbonaceous but also for nitrogenous materials which they contain.

For removal of nitrogenous contaminations predominantly in the form of organic nitrogen and ammonia, the biological activating cleaning with a simultaneous oxidation of organic nitrogen from ammonia to nitrates is used by aerobic nitrification processes with following reduction of originated nitrates by denitrification processes to gaseous nitrogen.

The most used technological process of activating cleaning with simultaneous nitrification and denitrification is the lowly loaded activation by uniform activated sludge exposed alternately with and without a supply of oxygen, where, in the course with oxygen supply the nitrification and, without supply of oxygen, the denitrification proceeds. As the denitrification processes require the presence of organic compounds as donors of hydrogen for enzymatic microbial processes of denitrification, raw water with a content of organic materials is supplied, with the technology of complex activating cleaning by uniform activated sludge, into the anaerobic denitrification zone of the activating cleaning.

Conditions without the presence of dissolved oxygen have to be obtained in the denitrification space, which conditions occur with the passage of the activating mixture through the denitrification zone without oxygen supply after micro-organisms of the activated sludge have utilized the dissolved oxygen from the activating mixture. With the absence of dissolved oxygen, the micro-organisms obtain the oxygen from nitrates which are thus converted to gaseous nitrogen so that the nitrogenous materials are definitely removed from the cleaned water.

For a complex activating cleaning with denitrification the examplary embodiment shown in FIG. 1 is completed by a denitrification space not shown in the drawing, connected with the activating spacing by a circulating circuit. The efficiency of removal of nitrates with such a system is determined by the determined by the intensity of circulation of the activating mixture between the aerobic and anaerobic zone according to the equation:

$$C_{NO_3} = \frac{C^0_{NO_3}}{1 + N}$$

where $C_{NO_3}$ is the concentration of $NO_3$ in the cleaned water, $C^0_{NO_3}$ is the concentration of $NO_3$ with a zero circulation and n is the circulation of the activating mixture expressed in a multiple of the amount Q of cleaned water.

This means that for removal of 90% nitrates a circulation intensity 9Q is required. At higher concentrations of nitrogenous contaminations on the order $10^2$ to $10^3$ mg. per liter N—$NO_3$ and where reduction to 10 mg. per liter N—$NO_3$ is required, a rather high circulation intensity is needed. This complicates the technical solution of the apparatus for complex activating cleaning along two lines. There are claims on power and on the volume of denitrification. The increase of the volume of the denitrification follows from the amount of oxygen introduced into the denitrification with the activating mixture with intensive circulation between the aerobic and anaerobic activating zones. The size of the dentifrication space is thus determined—in addition by the nitrogenous contamination—primarily by the intensity of circulation and the amount of dissolved oxygen in the activating mixture entering the denitrification. The and is further increased as the increased denitrification space requires a large amount of power for the required movement of the activating mixture in the space to prevent sedimentation of the activated sludge.

With these conditions, the removal of nitrates to the required content for repeated utilization of cleaned water as technological water is economically rather expensive as it requires an excessive amount of power and large dimensions of the apparatus.

The method of denitrification in the fluid fliter after a primary reduction of nitrates by the described technology for denitrification leads therefore to a substantial reduction of the size of the apparatus by reduction of the denitrification with a simultaneous reduction of power consumption by reduction of circulation of the activating mixture, by reduction of power consumption for mixing the dentrification space and by a reduction of the oxygen concentration in the activating mixture. The denitrification in the fluid filter thus takes over the functioning of a second denitrification stage with the possibility of a reduction of the residual content of nitrates more economically than with a one stage denitrification process.

Figure 2:
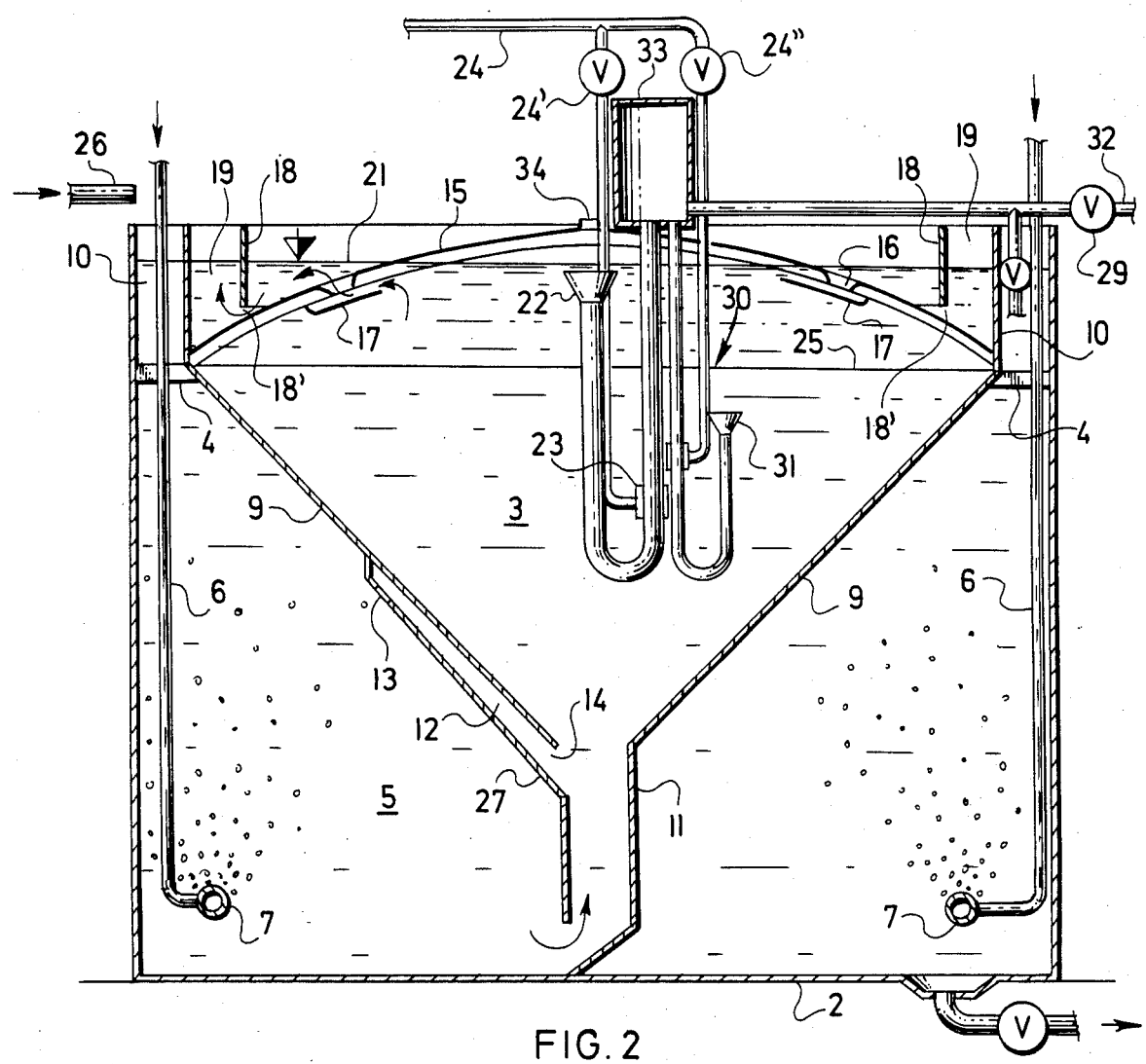
FIG. 2 the same view of an arrangement in a horizontal alternative with a rectangular plan view.
Figure 4:
FIG. 4 a sectional view of the wall of a cover made of corrugated material.

FIG. 2 shows another embodiment of the apparatus of the invention. The main difference with respect to the arrangement shown in FIG. 1 is that the container with mantle 1 and bottom 2 has a rectangular plan view. Certain differences in the construction of the arrangement follow even though all main parts are the same, i.e. one or more separators are provided in the container with a mantle 1 and a bottom 2. In the case given, there is one separator 3 with a rectangular plan view. The hydraulic arrangement of the transfer of the activating mixture from the activating space 5 to the separator 3 and the return of the thickened activated sludge from the separator 3 back into the activating space 5 are in principle the same. The technical solution utilizes, in this case, a single longitudinal by-pass channel 12 formed by a wall 27 and the partition wall 9 of the separator 3 separating the space of the separator 3 from the activating space 5. A change with respect to FIG. 1 is the arrangement of the cover 15 which here has the shape of a longitudinal vault preferably made of corrugated material, the section of which is indicated in FIG. 4. This may be sheet, glass laminate and the like, to secure the rigidity of the construction. The cover 15, covering the whole flow area of the separator 3, is, similar to the embodiment in FIG. 1, provided with collecting openings 16 screened against penetration of flotated sludged by screening walls 17 enabling entrance of cleaned water into the collecting system.

A longitudinally arranged collecting channel 19 is formed by a wall extension 10, in this case parallel with the immersed wall 18, situated on the cover 15, whereby the channels of undulated cover 15 form, with the immersed wall 18, openings 18'. The system for taking-off the flotated sludge is, in this case, formed by an inlet 22 having the shape of a collecting trough connected to the inlet of one or more air lift pumps 23, the outlet or outlets 35 of which terminate into the activating space 33 as mentioned in the embodiment of FIG. 1.

One or more air lift pumps 30 with inlets 31 situated below the surface 25 of the fluid filter are provided in the separator 3. One or more outlets 36 are connected similarly as in FIG. 1.

The arrangement shown in FIG. 2 operates in the same way as that shown in FIG. 1.

Figure 3:
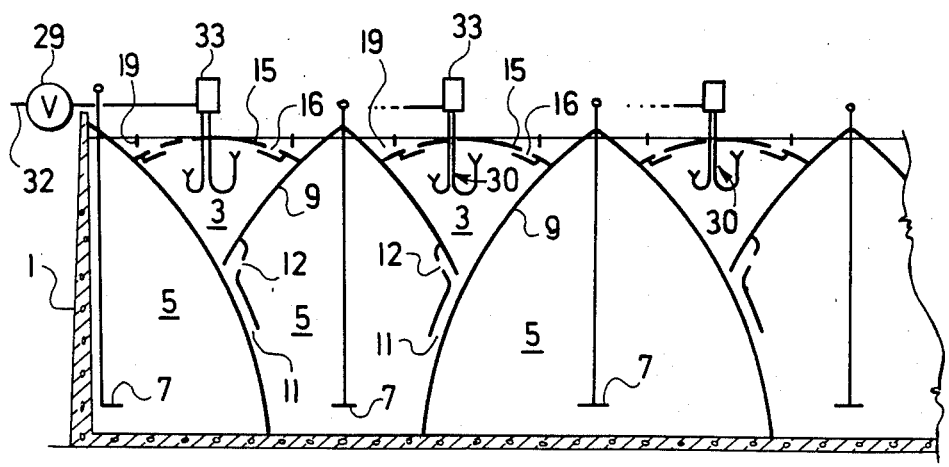
FIG. 3 a vertical sectional view of an arrangement in a horizontal alternative with rectangular plan view with a system of longitudinally adjacently arranged activating and separating spaces.

Arrangements with a rectangular plan view of the container and with a horizontal arrangement as in FIG. 2 are not limited to the described embodiment. They can be made advantageously in the alternatives for instance where more separators 3 of rectangular plan view are arranged side by side or one behind the other, whereby the partition walls 9 of these separators form self-supporting constructions as shown in FIG. 3.

Such an embodiment is advantageous for large plants of high output where the covers 15 are of a longitudinal arch shape and made of corrugated material increasing their rigidity.

Corrugated material can be also used for partition walls 9 forming here not only separators 3 but also one wall of channel 11 and also a major part of the walls defining activating spaces 5. The cover 15 forms a part of the self-supporting construction of separators 3, which contributes substantially to the increase of rigidity of the whole built-in part with the possibility of supporting the whole collecting system of cleaned water. This is important for larger capacities of the arrangement where substantial lengths of containers are required, requiring relatively large dimensions of collecting channels 19 which could otherwise be fixed reliably on the construction only with difficulties.

The described collecting system of cleaned water, together with the cover 15, the take-off of flotated sludge over funnel shaped inlets 22 of air lift pumps 23, and with inlets 31 of an air lift pump 30 for taking-off the upper layers of fluid filters require no access of attendants to the whole area of the arrangement which would otherwise require provision of walkways. The absence of walkways favorably reduces the weight of the construction and costs of manufacture and maintenance, contributing thus to a reduction of requirements of a self-supporting construction of separators 3 which can be designed solely as separating and guiding walls without a particular compression stress. The operation of this arrangement is in principle the same as with arrangements shown in FIGS. 1 and 2.

The arrangement shown in FIG. 3 is particularly suitable for cleaning large volumes of less concentrated waste waters, for example, urban waste waters. Cleaning plants of this type are usually connected to a common sewage system, having enormous requirements on the hydraulic load of the apparatus in the course of peak loads during rain. The described arrangement enables operation with a surface of the fluid filter at a level of the maximum flow area of the separator 3 without a danger of reduction of the efficiency of the whole arrangement due to escape of sludge by flotation.

An important feature of the arrangement according to this invention is the ability to increase its hydraulic capacity when cleaning common kinds of waste waters, for example urban waste waters, when compared with currently used arrangements where the flotation at usual conditions due to generation of gases in the fluid filter is not so conspicuous and shows solely as deterioration of the quality of water due to undissolved materials contained therein.

The arrangement according to this invention enables, in such a case, a substantial increase of capacity by increase of the hydraulic load due to the described operation with a larger volume of the fluid filter and at reduced oxygen content in the activating mixture. This offers both a reduction of investment costs—smaller dimensions—and also of costs of operation due to reduced power consumption.

An advantage of both the method and the apparatus according to this invention is an increased efficiency of the cleaning process both in parameters of nitrogenous and carbonaceous contaminations. This is important for cleaning of large volumes of waste waters with low concentrations and with a low content of nitrogenous contaminations where it is possible to achieve, by the denitrification in the fluid filter, a substantial reduction of nitrates without the necessity of adding an independent denitrification. A substantial increase of the capacity of separation and thus also of the whole arrangement is also achieved simultaneously with the increased efficiency in cleaning. The saving of electric power is also not negligible.

A further advantage of the arrangement according to this invention is the extended application of fluid filtration technology in the technology of water cleaning to waste waters where a flotation of a large amount of activated sludge takes place in the separating space. This concerns particularly waste waters containing nitrogenous material, the cleaning of which uses a lowly loaded activation with simultaneous nitrification of organic and ammonia nitrogen to nitrates.

With a complete cleaning of these kinds of waste waters, denitrification included, the arrangement according to this invention reduces also claims on the volume of the denitrification space and on the consumption of electric power for aeration of the activating mixture in the aerobic activating process by reduction of the oxygen concentration to a degree required for aerobic activation without requirement of an increased oxygen content for prevention of postdenitrification processes in the layer of the fluid filter.

The economic removal of nitrates up to a level of 10 mg. per liter N—NO$_3$ opens the way for waste free technologies with repeated application of the cleaned water in closed circulation circuits.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. An apparatus for biological activating cleaning of waste waters containing nitrogenous materials at conditions of lowly loaded sludge with simultaneous nitrification of organic nitrogen and ammonia to nitrates using fluid filtration, comprising a container having
a mantle and
a bottom;
a separator for fluid filtration is connected within the upper part of said mantle in said container, the remaining space beyond the separator is
an activating space which is located under
partition walls separating said separator from said activating space, and in which air is supplied to the waste water to be cleaned by
aeration elements, located within said activating space which are near the bottom of the container, and, which are connected to
air supply and distribution conduits;
a space for fluid filtration, the throughflow area of said fluid filtration space is determined by said partition walls and increases in the upward direction, whereby the surface of the fluid filter is substantially at the maximum width of the space for the fluid filtration;
a cover with collecting openings for cleaned water;
screening walls in front of said openings for preventing passage of floatated sludge through said collecting openings;
a collecting system of cleaned water connected with said collecting openings;
a gas outlet provided at the central top part of said cover;
a take-off of cleaned water provided below the level of cleaned water;
means for taking-off floatated sludge;
means for taking-off the upper layer of the fluid filter, the inlets of which are arranged below the surface of the fluid filter.

2. An apparatus as in claim 1, wherein the means for taking-off the floated sludge comprises an air lift pump, the inlet of which has a funnel shape and opens upwards, with means for connecting the outlet of said pump with the activating space and with a discharge of excess activated sludge.

3. An apparatus as in claim 2 further comprising a deaerating receptacle on the top of the cover, the outlet of the air lift pump for taking-off flotated sludge terminating into said receptacle, with conduit means with closures allowing passage of the flotated sludge back to the activating space and to discharge means of excess activated sludge.

4. An apparatus as in claim 1, wherein the means for taking-off the upper layer of the fluid filter comprises a second air lift pump, the inlet of which has a funnel shape and opens upwards; and means for connection of the second pump's outlet with the activating space.

5. An apparatus as in claim 1, wherein the cover has a conical shape.

6. An apparatus as in claim 1, wherein the cover has the shape of a vault.

7. An apparatus as in claim 1, wherein the cover has the shape of a longitudinal, cylindrical vault.

8. An apparatus as in claim 1, wherein the cover comprises corrugated sheet material.

9. An apparatus as in claim 3, comprising an air lift pump for taking-off the upper layer of the fluid filter, the air lift pump having an outlet which terminates in the deaerating receptacle.

* * * * *